United States Patent
Casalena et al.

(10) Patent No.: US 7,944,174 B2
(45) Date of Patent: May 17, 2011

(54) BATTERY PACK, CHARGER AND TERMINAL BLOCK ARRANGEMENTS FOR CORDLESS POWER TOOL SYSTEM

(75) Inventors: Adam M. Casalena, Perry Hall, MD (US); Daniel J. White, Baltimore, MD (US); Steven J. Phillips, Ellicott City, MD (US); Brent A. Kuehne, Red Lion, PA (US); Mark M. Data, Bolingbrook, IL (US); Arvind Patel, Naperville, IL (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/588,445

(22) Filed: Oct. 15, 2009

(65) Prior Publication Data

US 2010/0108341 A1 May 6, 2010

Related U.S. Application Data (62) Division of application No. 11/553,355, filed on Oct. 26, 2006, now Pat. No. 7,618,741.

(60) Provisional application No. 60/731,273, filed on Oct. 31, 2005, provisional application No. 60/731,272, filed on Oct. 31, 2005.

(51) Int. Cl.
  *H01M 10/38* (2006.01)
(52) U.S. Cl. .................. 320/112; 320/129; 429/163
(58) Field of Classification Search ........... 320/112, 320/116, 114, 113; 429/163, 164, 169, 167, 429/151, 129
See application file for complete search history.

(56) References Cited

U.S. PATENT DOCUMENTS

| | | | | |
|---|---|---|---|---|
| 5,244,755 | A | * | 9/1993 | Benoist et al. ........... 429/97 |
| 5,626,979 | A | * | 5/1997 | Mitsui et al. ............ 429/97 |
| 5,789,101 | A | * | 8/1998 | Wheeler et al. .......... 429/98 |
| 5,792,573 | A | * | 8/1998 | Pitzen et al. ............ 429/97 |
| 5,977,746 | A | | 11/1999 | Hershberger |
| 6,428,925 | B1 | * | 8/2002 | Takeno et al. ........... 429/163 |
| 7,211,347 | B2 | * | 5/2007 | Sugiura et al. .......... 429/120 |
| 2002/0089306 | A1 | * | 7/2002 | Kubale et al. ........... 320/112 |
| 2003/0082439 | A1 | | 5/2003 | Sakakibara |
| 2003/0096160 | A1 | | 5/2003 | Sugiura |
| 2004/0017177 | A1 | | 1/2004 | Santana, Jr. |
| 2005/0264259 | A1 | | 12/2005 | Santana, Jr. |

FOREIGN PATENT DOCUMENTS

EP  1035599 A1  9/2000

OTHER PUBLICATIONS

Cappadonia, Marcella—European Search Report (EP06123196)—Jul. 9, 2010—Munich.

* cited by examiner

*Primary Examiner* — Edward Tso
*Assistant Examiner* — Alexis Boateng
(74) *Attorney, Agent, or Firm* — Harness, Dickey & Pierce, P.L.C.

(57) ABSTRACT

A battery pack, charger, and terminal blocks for the pack, charger and a cordless power tool are provided. The pack includes battery cells disposed between end caps within a bottom housing of the pack, and a potting boat for housing pack electronics electrically connected to the cells between the end caps and disposed within a pack top housing. A pack terminal block is connected to the potting boat within the top housing. The charger and the power tool each include a terminal block for providing electrical connections between the charger/tool and the battery pack. The terminal block is configured to float side-to-side to provide displaceable movement of the terminal block within the charger housing or tool housing for aligning the battery pack terminal block therein.

20 Claims, 11 Drawing Sheets

BATTERY PACK, CHARGER AND TERMINAL BLOCK ARRANGEMENTS FOR CORDLESS POWER TOOL SYSTEM

PRIORITY STATEMENT

This application claims priority to, and is a divisional of, pending U.S. patent application Ser. No. 11/553,355 filed Oct. 26, 2006, which claims priority to U.S. provisional applications No. 60/731,273, filed Oct. 31, 2005, and No. 60/731,272, filed Oct. 31, 2005. Priority to each application described above is claimed in this application and the entire contents of each application described above is hereby incorporated by reference.

BACKGROUND

1. Field of the Invention

Example embodiments relate generally to battery pack and charger for a cordless power tool system, to a terminal block for the battery pack, and to a terminal block for a cordless power tool and the battery charger which interfaces to the battery pack terminal block.

2. Description of Related Art

Cordless products which use rechargeable batteries are prevalent throughout the workplace as well as in the home. From housewares to power tools, rechargeable batteries are used in numerous devices. Ordinarily, nickel-cadmium (NiCd), nickel metal-hydride (NiMH) and/or Lithium-ion (Li-ion) battery cells are used in these devices. Since the devices use a plurality of battery cells, the battery cells are ordinarily packaged as battery packs. These battery packs may be coupled with the cordless devices and be secured to the device. The battery pack may be removed from the cordless device and charged in a battery charger or charged in the cordless device itself.

One of the disadvantages associated with cordless devices is the frequent charging of the battery pack due to power limitations of the battery pack. The charging of the battery requires releasably disconnecting the battery pack to the cordless device. As a result, the connections between the battery pack and the cordless devices may weaken (deteriorate the electrically connections) and/or damage the connections.

Terminal blocks can be provided on the battery pack and the cordless device for releasably interconnecting and electrically connecting the battery pack to the cordless device. The terminal blocks can include connections that prevent any lateral and longitudinal movement relative to the each terminal block.

Moreover, the battery pack can be centered along an axis of the cordless device through engagement of guide rails on the battery pack with cooperating guide rails carried by the cordless device. The battery pack is then more finely centered through engagement of the tool terminal block with the battery pack terminal block.

However, due to the frequent interconnections between the terminal blocks, blades on the terminal blocks may deteriorate or be damaged. This can cause misalignment between blades of two connected terminal blocks. This misalignment can adversely affect the mechanical and electrical contact between the two terminal blocks.

SUMMARY

An example embodiment is directed to a battery pack having a pack housing comprised of a top housing portion and a bottom housing portion, and a plurality of battery cells disposed between a pair of end caps within the bottom housing portion. The pack includes a potting boat disposed within the top housing portion. The potting boat houses pack electronics that are electrically connected to the cells between the end caps. The battery pack includes a terminal block connected to the potting boat and disposed within the top housing portion for engaging a terminal block of an attached cordless power tool or charger.

Another example embodiment is directed to a charger having a housing comprised of a top housing portion and a bottom housing portion. The charger includes an open deck cavity formed through the top and bottom housing positions for receiving a battery pack. The charger includes a pair of vertical spaced rails disposed in sides of the open deck cavity for engaging grooves on the battery pack. The charger includes a terminal block disposed within the open deck cavity for providing electrical connections between the charger and the battery pack. The terminal block is configured to float side-to-side to provide displaceable movement of the terminal block within the housing for aligning the battery pack within the charger.

Another example embodiment is directed to a cordless power tool. The cordless power tool includes a housing comprised of a first clam-shell half and a second clam-shell half joined together at a longitudinal centerline of the housing that bisects the two clam-shell halves. The cordless power tool includes a pair of spaced guide rails disposed on the bottom of the tool housing along opposing side edges at the housing bottom for engaging grooves of a battery pack. A terminal block is disposed in the bottom of the housing for providing electrical communications between the cordless power tool and the battery pack. The terminal block is configured to float side-to-side to provide displaceable movement of the terminal block within the housing for aligning the battery pack with the power tool.

Another example embodiment is directed terminal block of an electrical device for engagement with a battery pack terminal block. The device terminal block includes a main body, a logic terminal centrally located in the main body between a single power terminal and a pair of power terminals, and a logic terminal protector disposed below the logic terminal. A plurality of ribs is disposed on one of an underside of the main body above the logic terminal and a surface of the logic terminal protector below the logic terminal.

Another example embodiment is directed to a system having a battery pack and battery charger. The pack includes a pack housing and battery terminal block disposed therein. The battery terminal block includes a battery logic area and a plurality of female power terminals. The pack housing includes a pair of grooves, each groove formed along opposite sides of the pack housing.

The charger includes a charger housing having a pair of vertically spaced guide rails for slidably receiving the corresponding grooves in the pack housing. The charger housing includes a charger terminal block disposed in an open cavity of the charger housing for receiving the battery terminal block of the pack. The charger terminal block includes a logic terminal configured to mate within the battery logic area and includes a plurality of male blade terminals for engaging the female terminals in the battery terminal block. The charger terminal block is displaceable within the open cavity so that it can move side-to-side to align the battery terminal block relative to the charger terminal block prior to connecting the corresponding terminal blades and logic terminals.

Another example embodiment is directed to a system having a battery pack and cordless power tool. The pack includes a pack housing and a battery terminal block disposed therein, and the battery terminal block includes a battery logic area and a plurality of female power terminals. The pack housing includes a pair of grooves, each groove formed along opposite sides of the pack housing.

The power tool includes a tool housing having a pair of spaced guide rails disposed on side edges at a bottom of the tool housing and slidably receivable in the corresponding grooves of the pack housing. The tool housing includes a tool terminal block for mating with the battery terminal block. The tool terminal block includes a logic terminal configured to mate within the battery logic area and a plurality of male blade terminals for engaging the female terminals in the battery terminal block. The tool terminal block is displaceable within the tool housing so that it can move side-to-side to align the battery terminal block relative to the tool terminal block prior to connecting the corresponding terminal blades and logic terminals.

BRIEF DESCRIPTION OF THE DRAWINGS

Exemplary embodiments of the present invention will become more apparent by describing, in detail, exemplary embodiments thereof with reference to the attached drawings, wherein like procedures are represented by like reference numerals, which are given by way of illustration only and thus do not limit the present invention.

DETAILED DESCRIPTION OF EXEMPLARY EMBODIMENTS

It should be noted that these figures are intended to illustrate the general characteristics of method and apparatus of exemplary embodiments of this invention, for the purpose of the description of such exemplary embodiments herein. These drawings are not, however, to scale and may not precisely reflect the characteristics of any given embodiment, and should not be interpreted as defining or limiting the range of values or properties of exemplary embodiments within the scope of this invention. The relative dimensions and size of the tool, the battery pack and the battery charger may be reduced or exaggerated for clarity. Like numerals are used for like and corresponding parts of the various drawings.

As used herein, power tools may be understood as a cordless power tool with the use of light-weight portable power sources, such as lithium-ion (Li-ion) battery packs that may provide the commensurate power with its use. Exemplary power tools may include, but are not limited to, drills, high torque impact wrenches, single-handed metal working tools, nailers, hand planers, circular saws, jig saws, variable speed belt sanders, reciprocating saws, two handed drills such as rotary and demolition thickness hammerdrills, routers, cut-off tools, plate joiners, drill presses, table saws, planers, miter saws, metal working tools, chop saws, cut-off machines, bench grinders, etc. Some of these tools may currently be commercially available only in a corded version, but may become cordless. These classifications are not intended to be inclusive of all power tools in which exemplary embodiments of the present invention may be applied, but are only illustrative.

It should be appreciated by one skilled in the art that the battery pack described herein includes a plurality of battery cells disposed within a battery pack housing. The battery pack may be embodied as at least one of a lithium ion (Li-ion), a nickel cadmium (NiCd), a nickel metal hydride (NiMH) and a lead-acid battery pack, for example, in terms of the chemistry makeup of individual cells, electrodes and electrolyte of the battery pack. The battery cells may be connected in series and/or parallel.

With continued reference to the figures, example embodiments pertain to interfaces between a cordless power tool 30 and a battery pack 10, and interfaces between a battery charger 50 and a battery pack 10. During the remainder of this detailed description, it will be understood that the interfaces described herein may be employed in various other tools, which may be substantially identical.

Figure 1:
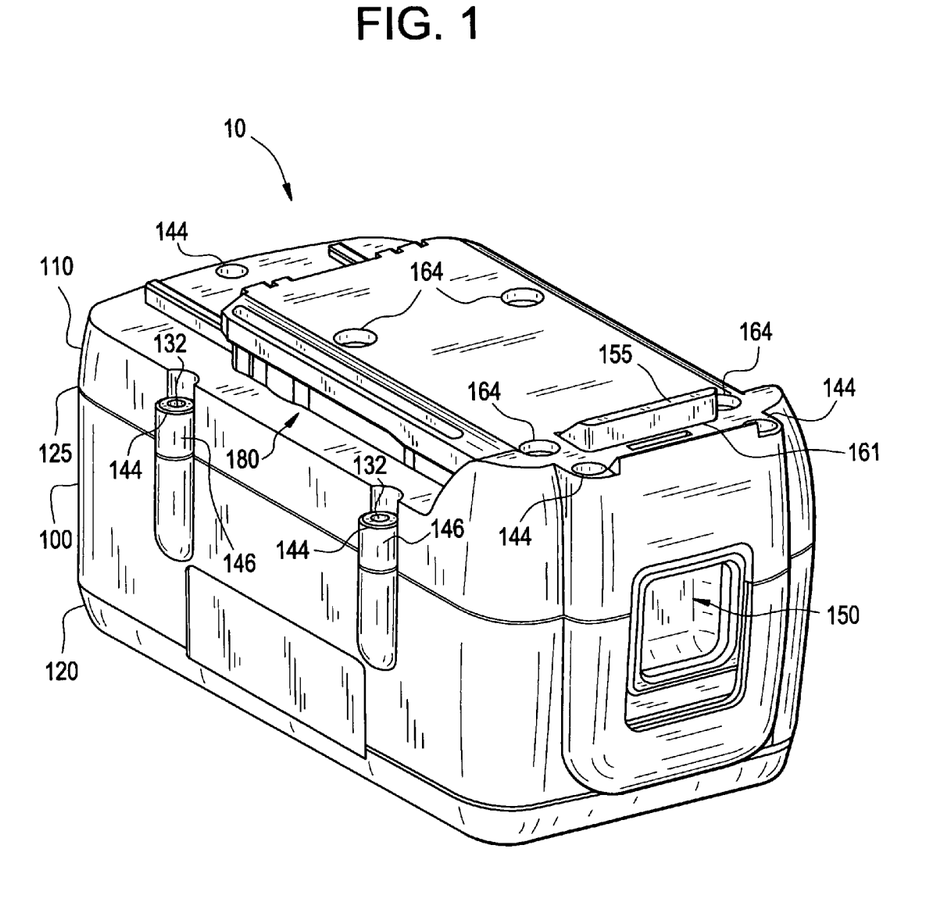
FIG. 1 is a schematic view of a battery pack in accordance with an exemplary embodiment of the present invention.

FIG. 1 is a schematic view of a battery pack in accordance with an example embodiment. The battery pack 10 includes a housing 100. The housing 100 is shown to include a top housing 110 and a bottom housing 120 which are joined at a longitudinally extending parting line 125. Alternatively, it will be understood that the housing 100 may include a pair of halves joined at a laterally extending parting line, or various other constructions including two or more housing portions. In an exemplary embodiment, the battery pack housing 100 has an overall length of approximately 11 cm, an overall width of approximately 7.75 cm, and an overall height of approximately 3 cm.

The top and bottom housing 110 and 120 may each be unitarily constructed from a rigid plastic or other suitable material. The top and bottom housings 110 and 120 are joined by thread-forming fasteners 132. The thread-forming fasteners 132 pass through cooperating apertures 144 and/or through the apertures 144 and screw boss portions 146 integrally formed in the sides of each of the top and bottom housings 110 and 120. Upon assembly, the fasteners 132 thread into the screw boss portions 146 of housing 100. However, it should be appreciated that the top and bottom housings 110, 120 may be attached by other means known in the art. Further, the bottom housing 120 is provided with a peripheral groove 152 (shown in FIG. 3) extending around an upper edge portion of the bottom housing 120 so as to receive a corresponding mating rib 193 (shown in FIG. 2) peripherally extending around the lower half of the top housing 110.

The top housing 110 includes a slotted opening 161 in which a latch 155 extends therethrough. The latch 155 is a release mechanism for releasing the battery pack 10 from the power tool 30. An operator can release the battery pack 10 from the power tool 30 by depressing a latch release button 150. Preferably, the latch release button 150 is disposed on a back region of the pack 10. By depressing the latch release button 150, the latch 155 is urged from the "lock" position to a "release" position. In the "release" position, the latch 155 no longer obstructs a recess area (not shown) in the tool 30. As a result, the battery pack 10 can be easily removed from the battery receiving portion of the power tool 30 by depressing the latch release button 150 disposed at the back region of the pack 10.

The top housing 110 includes a plurality of openings 164 for receiving thread-forming fasteners (not shown) to attach a potting boat 190 (shown in FIG. 3), which will be described in detail later.

Figure 2:
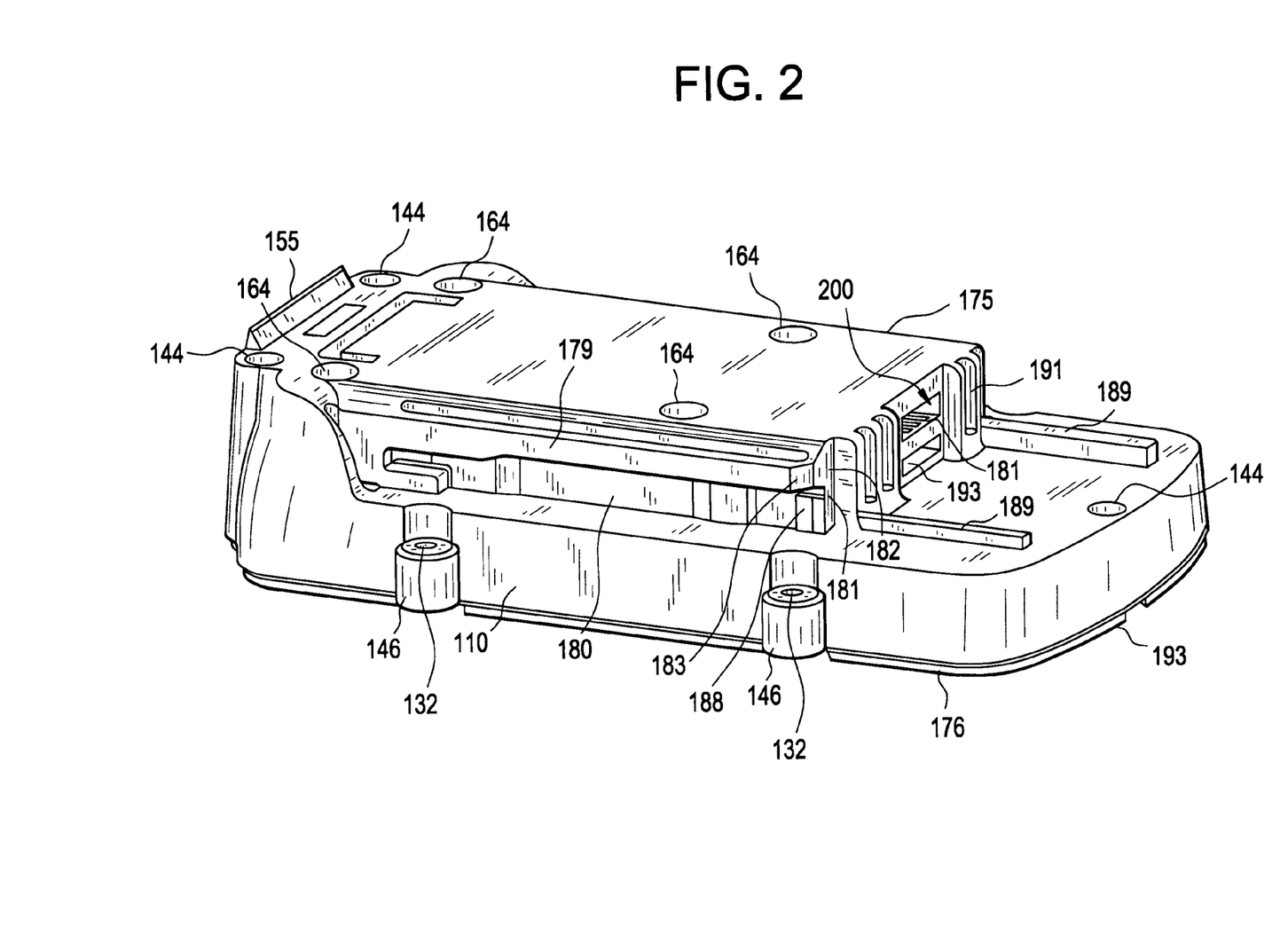
FIG. 2 is a schematic view of a top housing of the battery pack in accordance with an exemplary embodiment of the present invention.

FIG. 2 is a schematic view of a top housing 110 of the battery pack in accordance with an example embodiment. Referring to FIG. 2, the top housing 110 includes an upper portion 175 which is slidably engageable with a cordless power tool 30 or charger 50, and a lower portion 176. A battery pack terminal block 200 is disposed in the upper portion 175 which will be described further below. Constructing the top housing 110 shape to include the upper portion 175 provides an efficient alignment system between the battery pack 10 and the cordless power tool 30 during insertion and withdrawal. In other words, the upper portion 175 of the top housing 110 acts to coarsely align the battery pack 10 with a tool housing or charger housing, and reduces the tolerance stack-up to only two parts. This is unlike conventional cordless interfaces which provide numerous stack-up parts (e.g., battery housings and numerous rail systems).

The top housing 110 includes a groove 180 formed in each side beneath the guide rails 179 for slidably engaging guide rails (not shown) of a cordless power tool 30 or charger 50. The groove 180 enables alignment of guide rails on a tool (or charger) housing (not shown) so that the tool terminal block 300 directly contacts the battery terminal block 200. Because the two terminal blocks 200, 300 have direct access for alignment purposes, the number of tolerance stack up parts needed for alignment may be reduced.

To facilitate insertion and releasable attachment of the battery pack 10 to the cordless power tool 30, the upper portion 175 of the top housing 110 includes a pair of guide rails 179, each guide rail 179 formed in a side of the top housing 110. The guide rails 179 are slidably received into cooperating channels defined by rails 612, 614 (shown best in FIG. 8) formed in a housing 600 of cordless power tool 30. Specifically, a bottom of the tool housing 600 is constructed and arranged to receive and secure the battery pack 10 within a battery receiving portion 202.

The guide rails 179 generally have an inverted "L-shaped" configuration and are composed an upright member 181 extending upwards from a horizontal surface of top housing 110, and a flange member 182 extending laterally from and substantially perpendicular to the upright member 181 as shown in FIG. 2. The laterally spaced guide rails 179 are mirror-images of each other to slidably engage and cooperate with first and second guide channels 612, 614, respectively, of the cordless power tool 30. The flange member 182 of each guide rail 179 includes a chamfered or beveled leading edge 183. The chamfered or beveled leading edges 183 allow for easier alignment and interconnection between the guide rails 179 and the guide channels 612, 614. Openings 188 are located beneath the beveled edges 183 of flange 182 on each side are for securing a battery terminal block 200 within the top housing 110. Ends of the battery terminal block 200 slightly protrude or jut out through the openings 188.

The battery pack terminal block 200 is thus disposed within the upper portion 175 of the top housing 110. The battery pack terminal block 200 generally includes a main body portion 210 (shown in FIG. 5) which matingly engage a terminal block 300 of a cordless power tool 30 or charger 50.

Figure 9:
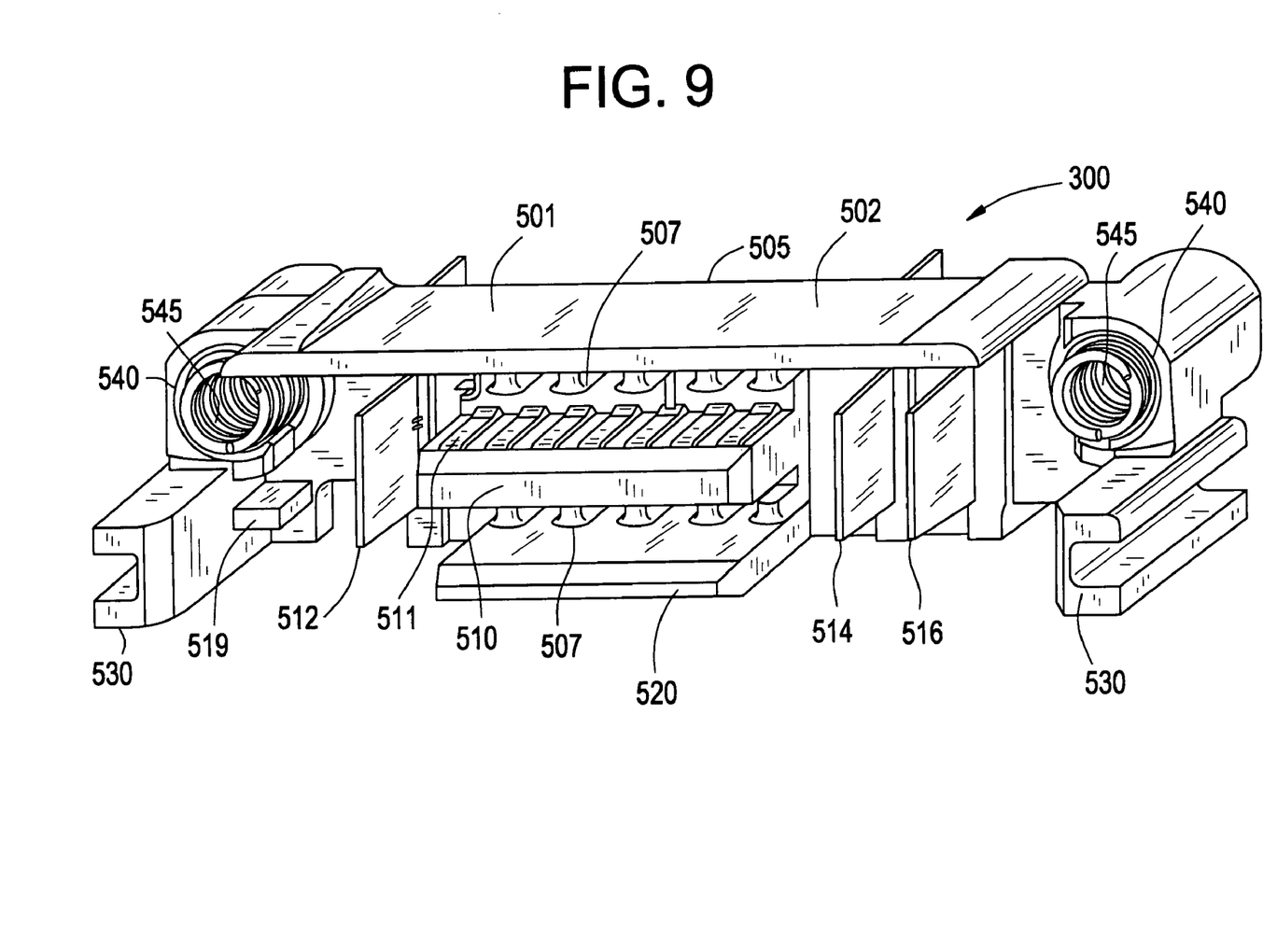
FIG. 9 is a schematic view of a tool terminal block in accordance with an exemplary embodiment of the present invention.

The upper portion 175 includes a plurality of blade terminal openings 191 for receiving corresponding terminals 512, 514, 516 (as best shown in FIG. 9) of the tool/charger terminal block 300. The blade terminal openings 191 ensure a proper, alignment therein of the blade terminals 512, 514, 516 of the tool/charger terminal block 300, and prevent entry of any bent or damaged blade terminals 512, 514, 516 from engaging the battery pack terminal block 200.

Located on a top forward surface of the bottom portion 120 near the blade terminal openings 191 are rails 189 to help facilitate the insertion of the terminal block 300 of the cordless power tool 30 or charger 50. In other words, the rails 189 can grossly or coarsely align the two terminal blocks 200, 300. Moreover, during engagement of the two terminal blocks 200, 300, the rails 189 act to prevent displaceable movement of the tool/charger terminal block 300, block 300 when is engaged to battery pack terminal block 200. In other words, the rails 189 permit a slight tolerance (±2 mm) of displaceable movement of the attached tool/charger terminal block 300.

Figure 3:
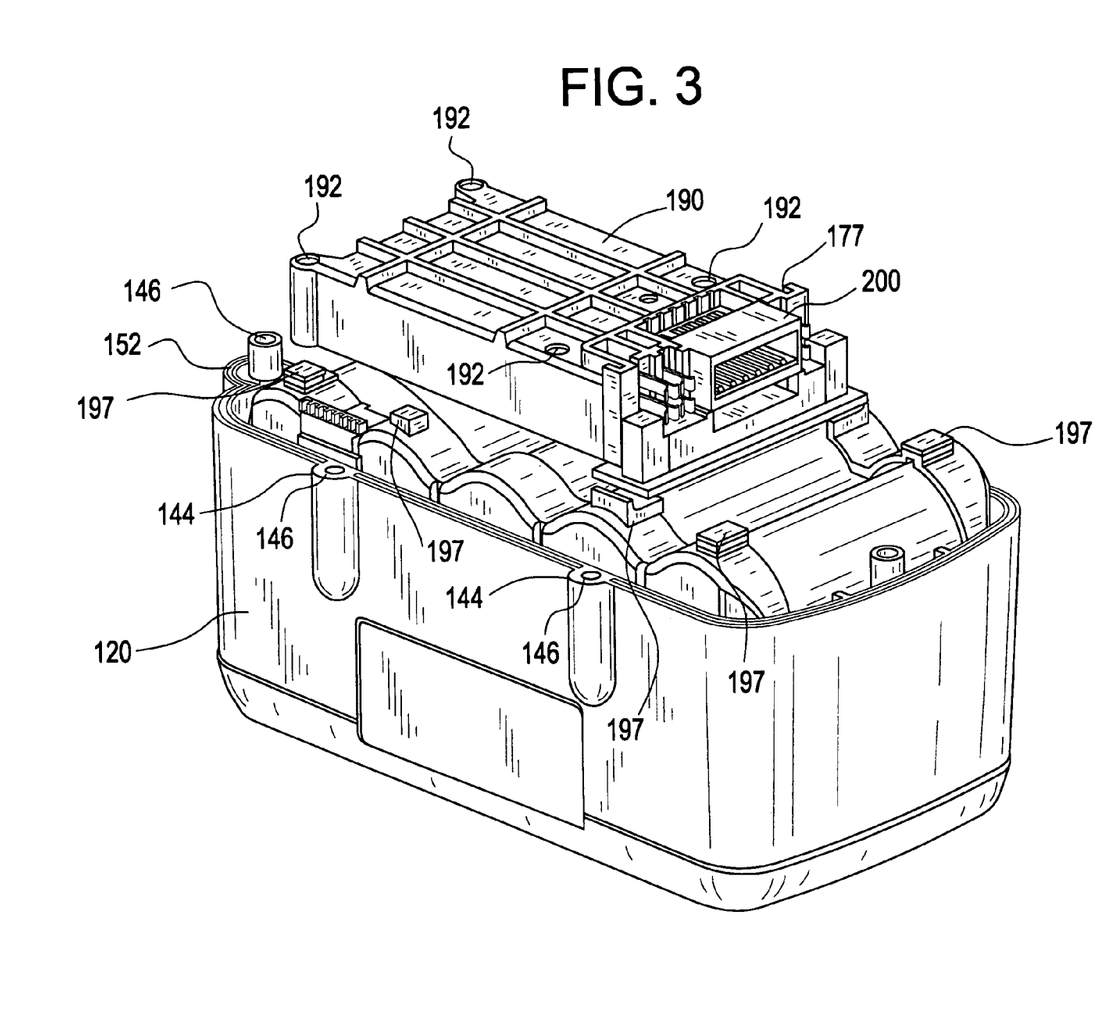
FIG. 3 is a schematic view of the battery pack without the top housing in accordance with an exemplary embodiment of the present invention.

FIG. 3 is a schematic view of the battery pack 10 without the top housing 110 to expose the inside of the pack 10. As shown in FIG. 3, the pack 10 includes a potting boat 190 connected to the terminal block 200. The potting boat 190 and the terminal block 200 may be joined by a tongue and groove connection 177. It should be appreciated that other connections may be employed. The connection 177 will seal the interface between the potting boat 190 and the terminal block 200 to permit pack electronics to be filled within the potting boat 190 with a potting compound. The potting compound also helps to mechanically restrain the terminal block 200 in position within the battery pack 10. Moreover, by connecting the terminal block 200 to the potting boat 190, the terminal block 200 acts as a fourth wall of the potting boat to contain the potting material housing pack electronics in the boat 190, as compared to when the terminal block 200 is located on top of the potting boat 190. This results in a more efficient and slender construction of the pack 10.

The potting boat 190 includes openings 192 on a top surface to receive fasteners 132 so as to secure the top housing 110 to the potting boat 190. In particular, the potting boat 190 and terminal block 200 fit up within a recessed area (not shown) within the interior of the top portion 175 of top housing 110. Referring also to FIGS. 1 and 2, fasteners 132 extend through openings 164 in the upper portion 175 to engage threaded openings 192 at the corners of the potting boat 190. This secures the potting boat 190 with attached battery pack terminal block 200 up within top portion 175. The potting boat 190 is inverted within top portion 175, such that the pack electronics restrained within the potting boat 190 by the potting compound are facing downward toward the bottom housing 120.

Figure 4:
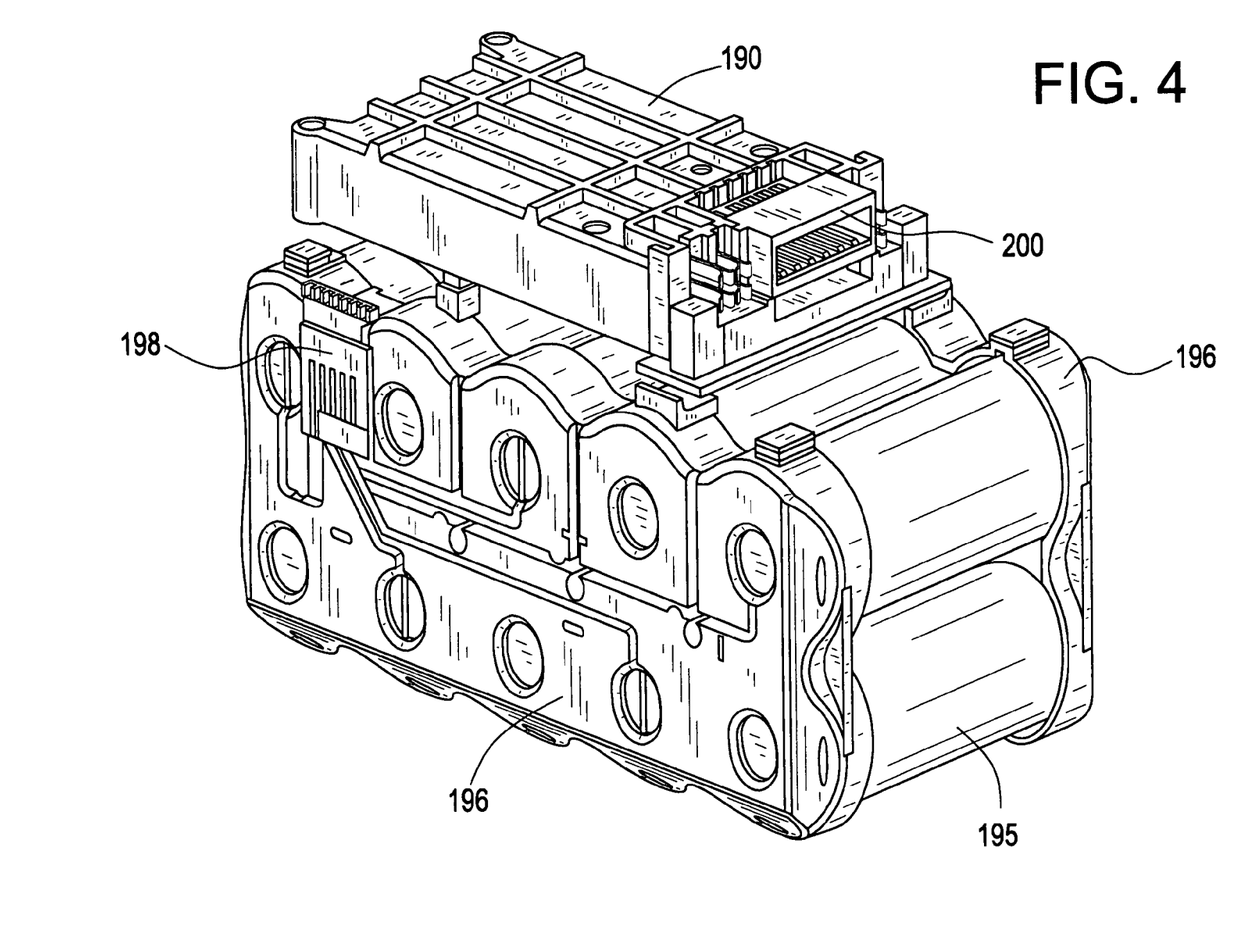
FIG. 4 is a schematic view of a battery cell arrangement in accordance with an exemplary embodiment of the present invention.

Referring to FIG. 4, and also with reference to FIG. 3, the potting boat 190 is spaced from the end caps 196 containing the cells 195 there between. Clearance between the potting boat 190 in the top housing 110 and the end caps 196 in the bottom housing 120 is provided by a plurality of raised projections 197 which are formed along the top sides of the end caps 196. These projections 197 provide proper alignment between components in the top and bottom housings 110, 120 as the housings 110, 120 are clamped together.

The end caps 196 serve as a backbone to support all of the battery internal components, including the battery cells 195. The internal battery pack structural arrangement between the top and bottom housings is described in further detail in co-pending U.S. patent application Ser. No. 11/552,847 to Phillips et al., filed Oct. 25, 2006 and entitled "BATTERY PACK AND INTERNAL COMPONENT ARRANGEMENT WITHIN THE BATTERY PACK FOR CORDLESS POWER TOOL SYSTEM", the entire contents of which is hereby incorporated by reference herein.

Although not shown in FIGS. 3 and 4, the cells 195 are electrically connected to pack electronics within potting boat 190 via a connector attached to a wiring harness of the potting boat 190. The connector attaches to a connector 198 that is integrated within each end cap 196. Power terminal leads (not shown) from the cells 195 are also electrically connected to the battery pack terminal block 200, as is known.

Figure 5:
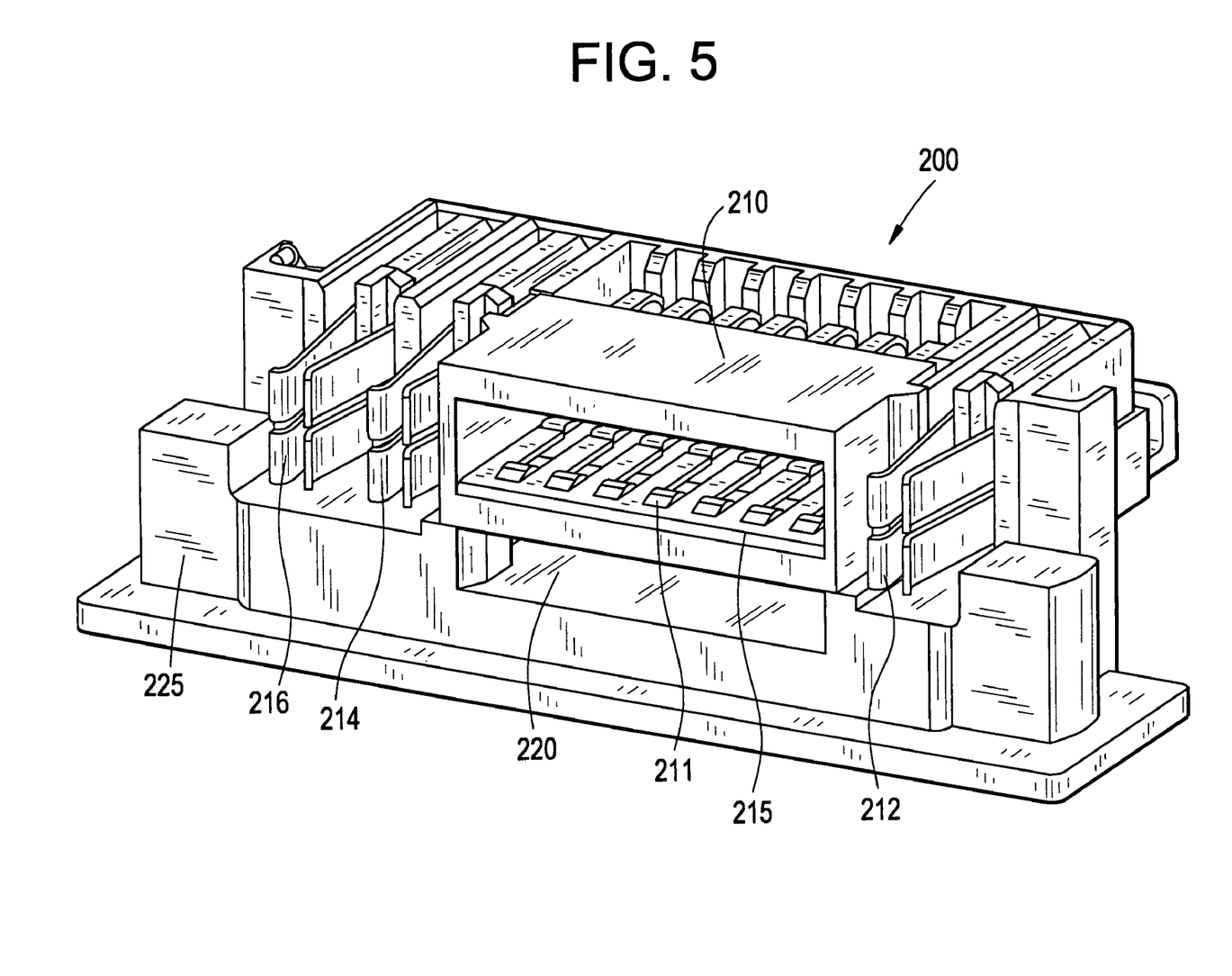
FIG. 5 is a schematic view of a battery pack terminal block in accordance with an exemplary embodiment of the present invention.
Figure 6:
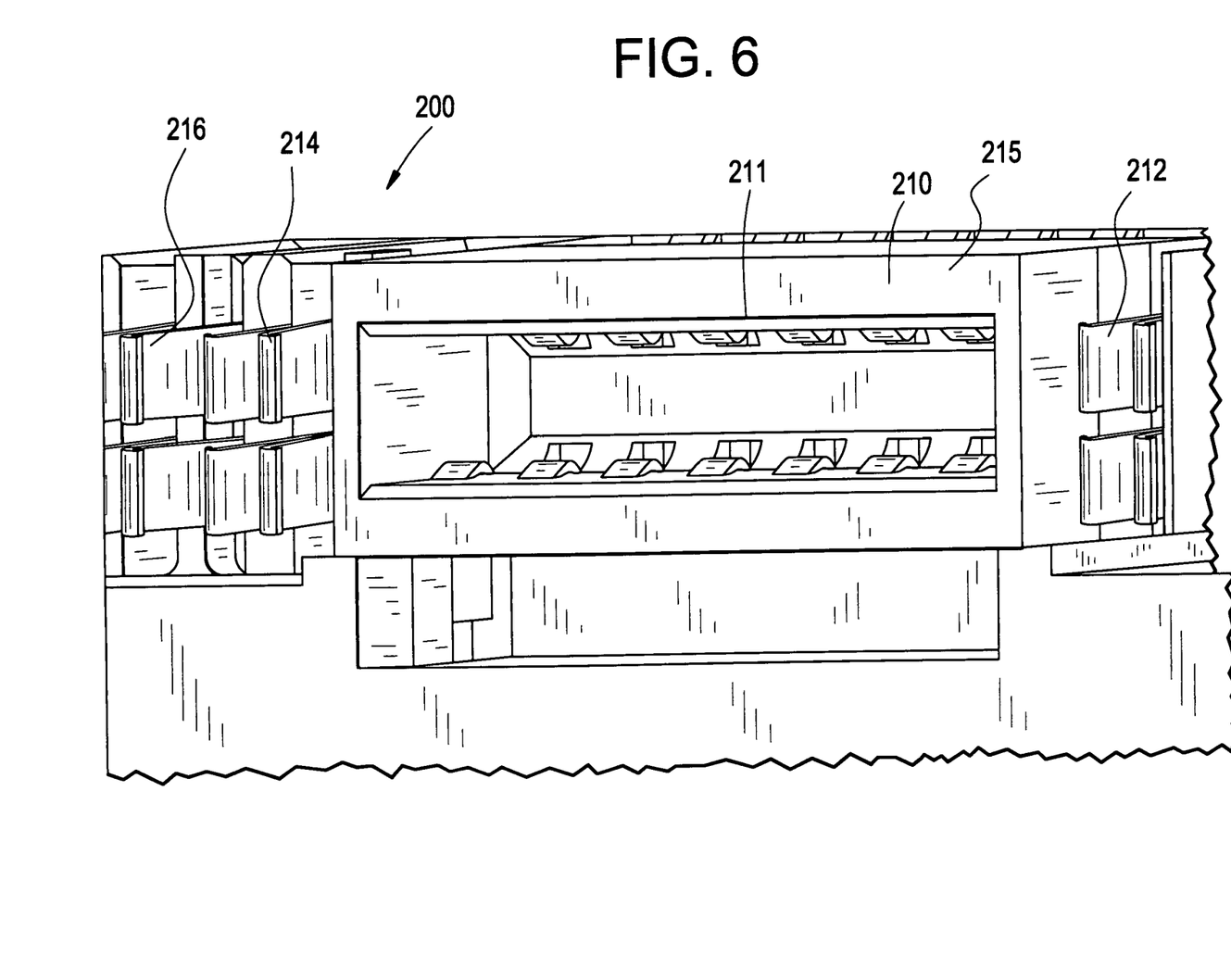
FIG. 6 is a schematic view of a terminal block in accordance with an exemplary embodiment of the present invention.

FIGS. 5 and 6 are schematic views of the battery pack terminal block 200. Referring to FIG. 5, the battery pack terminal block 200 is disposed within the top housing 110, and constructed and arranged to engage a terminal block 300 disposed within a cordless power tool 30 or charger 50. Accordingly, electrical communication is provided between the battery pack terminal block 200 and the tool/charger terminal block 300.

The battery pack terminal block 200 includes a battery logic area portion 215 adapted to receive a logic terminal of a tool/charger terminal block 300. A plurality of contacts 211 are provided on the interior surface of the battery logic area portion 215 to engage with a plurality of contacts (not shown) on the tool/charger terminal block 300. The plurality of contacts 211 may be formed on an upper surface and/or a lower surface of the battery logic area portion 215, as shown best in FIG. 6.

The battery pack terminal block 200 includes a plurality of tongues 212, 214 and 216 to conduct positive and negative charges. Tongue 212 engages with and is adapted to receive a male blade terminal 512 of the tool/charger terminal block 300, tongue 214 engages with and is adapted to receive male blade terminal 514, and tongue 216 engages with and is adapted to receive the male blade terminal 516 of the tool/charger terminal block 300 (shown in FIG. 9). The tongues 212, 214 and 216 may thus otherwise be understood as female terminals of terminal block 200. The tongues 212, 214 and 216 may be made from conductive metal, for example, such as phosphor bronze and/or beryllium copper, so as to conduct positive and negative charges. The tongues 212, 214, 216 also ensure a tight engagement with the terminal blades 512, 514, 516, respectively. In an example, tongue 212 is a positive terminal and tongues 214 and 216 are negative terminals The battery pack terminal block 200 includes an aperture 220 for receiving a logic terminal protector 520 of an attached tool 50 or charger 30 (shown best in FIG. 9). The aperture 220 should have the same dimensions as the logic terminal protector 520 so as to provide a tight engagement. The aperture 220 may also act as a centering and guiding means for the terminal blocks 200, 300.

With reference to FIGS. 5 and 9, the battery pack terminal block 200 includes a pair of laterally spaced protrusions 225. The protrusions 225 are adapted to slidably engage with an interior side of a pair of laterally spaced grooves 530 of the tool/charger terminal block 300. The laterally spaced protrusions 225 help to establish more precise alignment with the tool/charger terminal block 300. The leading edge of grooves 530 may be chamfered or beveled to facilitate the protrusions 225 slidably engaging the laterally spaced grooves 530.

Figure 7:
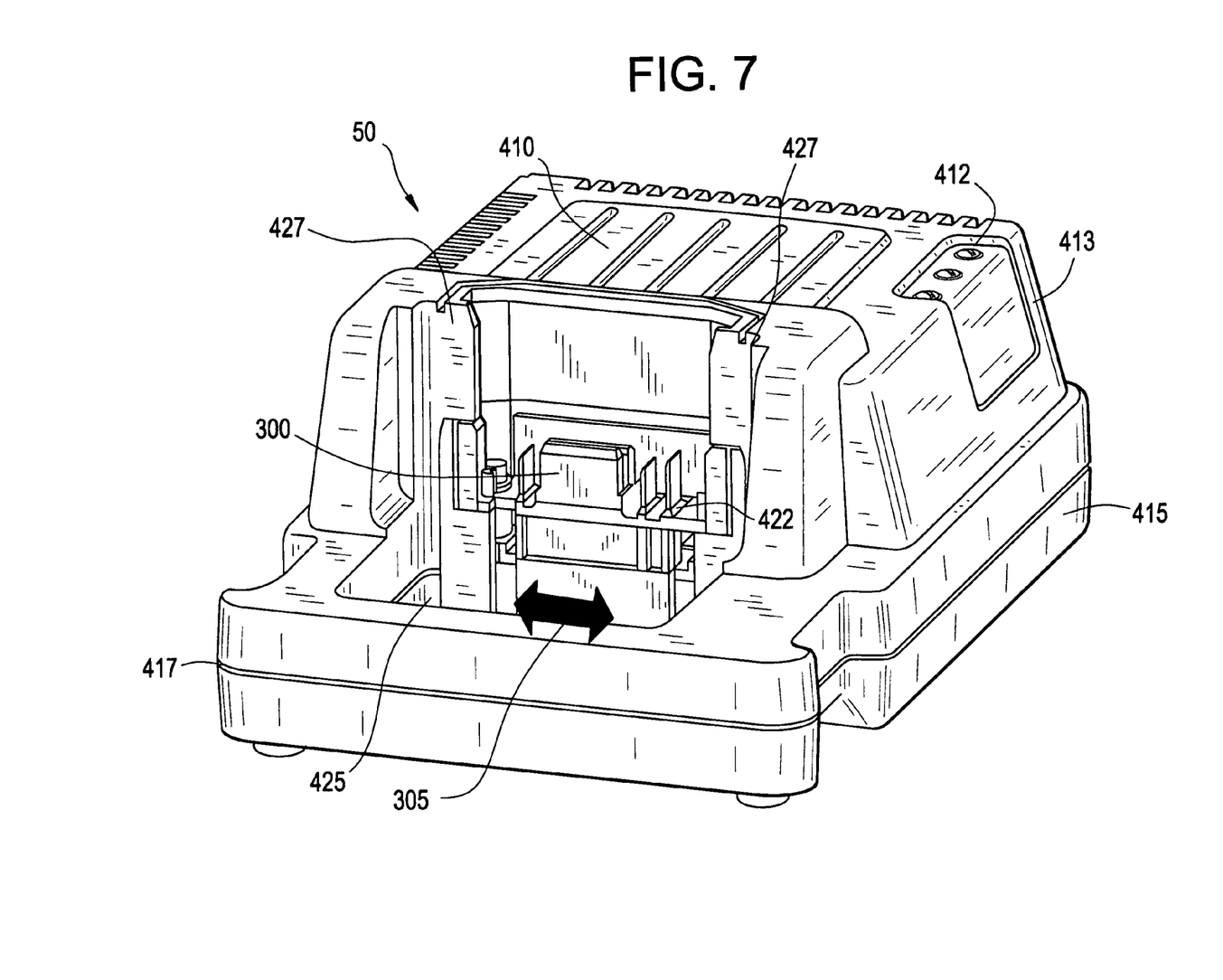
FIG. 7 is a schematic view of a charger with a terminal block in accordance with an exemplary embodiment of the present invention.

Reference should be made to FIGS. 7-11 for the following description directed to a terminal block for the cordless power tool 30 or charger 50. FIG. 7 is a schematic view of a charger 50 with a terminal block 300 in accordance with an exemplary embodiment. Referring to FIG. 7, the charger 50 includes a charger housing 410. The charger housing 410 includes a top housing 413 and a bottom housing 415 joined at a longitudinally extending parting line shown at 417. The charger housing 410 includes LED indicators 412 to indicate the status of charge in an attached battery pack. Although the exemplary embodiment illustrates three (3) LED indicators, it should be appreciated that more or less than three (3) indicators may be employed, depending on the functions desired. The charger housing 410 includes an open deck cavity 425 for vertically receiving a battery pack (not shown).

To facilitate releasable insertion of the battery pack 10 into the charger housing 410, the open deck cavity 425 includes a pair of grooves 427 at lateral sides of the open deck cavity 425. The pair of grooves 427 are adapted to receive cooperating guide rails 179 on the battery pack 10. Accordingly, insertion and removal of the battery pack 10 to/from the charger 30 may thereby be facilitated by the groove-rail engagement.

The battery charger terminal block 300 is disposed within the open deck cavity 425. The terminal block 300 provides the logic and power terminals connections between the charger 50 and battery pack 10, such as electrical communication between the charger 50 and battery pack 10. The terminal block 300 includes power terminals 512, 514, 516 and logic terminals 511 (as best shown in FIG. 9). In this example, the power terminals include one positive power terminal (male blade terminal 512) and two negative power terminals (male blade terminals 514, 516), one each for charge and discharge operations.

In FIG. 7, an arrow 305 is shown to illustrate the relative side-to-side displacement of the terminal block 300. The terminal block 300 can float (side-to-side) to align the terminals of the charger 50 while inserting the battery pack 10 into the charger 50. In an example, the displaceable movement can be ±2 mm in either direction. It should be appreciated that more or less side-to-side displacement of the terminal block 300 is possible depending on the design of the tool/charger.

The displaceable movement enables precise alignment to occur before any mating of any terminals (power or logic) of the terminal blocks 200, 300. Moreover, the displaceable movement of the tool/charger terminal blocks 200, 300 reduces the tight tolerance necessary to align the logic and power terminals because the alignment occurs before mating of any terminals. As discussed above, the rails 189 on the top housing 110 of pack 100 establishes the amount of displacement movement, as the two terminal blocks 200, 300 are connected.

Figure 8:
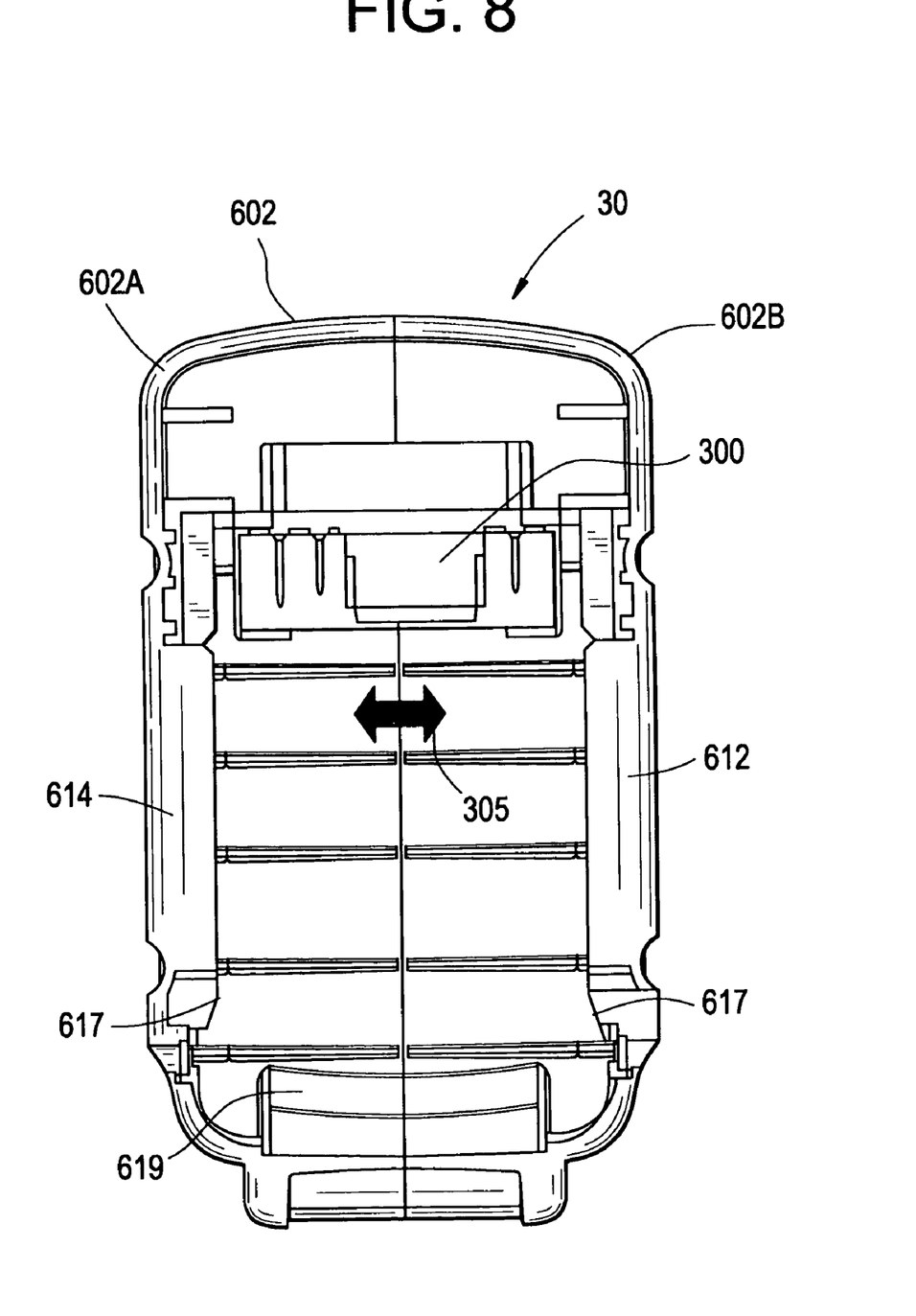
FIG. 8 is a plan view of a bottom of a power tool with a terminal block in accordance with an exemplary embodiment of the present invention.

FIG. 8 is a plan view of a bottom of a power cordless power tool 30 in accordance with an exemplary embodiment. For illustrative purposes, the power tool 30 is an electric power drill/driver; however, it should be appreciated that other power tools such as discussed above may be applicable. The cordless power tool 30 has a housing 602 that can be molded from a suitable plastic material, such as polyethylene, polypropylene, and/or polyurethane. In an example, the power tool housing 602 is injection molded having two halves portions 602A, 602B. The two halve portions 602A, 602B are secured together in a conventional manner using mechanical fasteners (not shown), such as screws.

A first guide rail 612 is formed along the right edge of housing 602 at the bottom of the cordless power tool 30, and a second guide rail 614 is formed along the left edge of housing 602. The first and second guide rails 612, 614 are designed to cooperatively mate with grooves of a battery pack. For example, specifically, the battery pack 10 in FIG. 2 includes corresponding grooves 180 to slidably engage and interlock with the first and second guide rails 612, 614, as previously discussed.

A chamfered or beveled edge 617 is formed at the leading edge of the guide rails 612, 614 to facilitate the alignment and interlocking between the grooves 180 on the battery pack 10 and the guide rails 612, 614 of tool housing 602.

The arrow 305 in FIG. 8 is to illustrate the relative side-to-side displacement of the tool terminal block 300. The tool terminal block 300 can float side-to-side to align the terminals of the cordless power tool 30 with the battery pack 10 prior to inserting the battery pack 10 into the cordless power tool 30. The displaceable movement may be ±2 mm in either direction or other appropriate distance depending on the design of the tool 30. The displaceable movement enables more precise alignment to be achieved between pack and tool terminal block 200, 300.

To further facilitate attachment of the battery pack 10 to the cordless power tool 30, a recess 619 is provided at the end of the cordless power tool 30. The recess 619 is conventional in construction and operation and engages a corresponding latch (not shown) of the battery pack 10 upon insertion. Removal of the battery pack 10 is thereby prevented until a spring bias of a latch is overcome in a conventional manner, insofar as the example embodiments are concerned.

FIG. 9 is a schematic view in detail of a terminal block 300 in accordance with an example embodiment. The terminal block 300 is useable in an electrical device such as the above discussed cordless power tool 30 or charger 50. The terminal block 300 may be molded from any suitable plastic material, such as glass-reinforced PBT, glass-filled nylon, polyethylene, polypropylene, and/or polyurethane. However, other materials may be used to manufacture the terminal block 300. The terminal block 300 engages the battery terminal block 200 (as shown best in FIG. 11).

Referring to FIG. 9, a main body 501 of the terminal block 300 includes a top plate 502 and back plate 505. The top plate 502 is fittingly attached to a surface on an electrical device such as a cordless power tool 30 or charger 50. The attachment of the top plate 502 to the cordless power tool 30 or charger 50 may be attached by, for example, a groove-guide arrangement, adhesive, fasteners or any other means. The back plate 505 includes the electrical connections of the logic and power terminals via wires (not shown).

The terminal block 300 includes a logic terminal portion 510 and power terminals (male blade terminals 512, 514 and 516). The logic terminal portion 510 is configured to be inserted into the battery logic area portion 215 of the battery pack terminal block 200. The logic terminal portion 510 includes a plurality of contacts 511 to engage with contacts 211 (as shown in FIG. 5) on the battery pack terminal block 200 for electrical communications. In an example, contacts 511 are provided on either or both surfaces of logic terminal portion 510, as shown in FIG. 5. The electrical communications functions of logic terminal portion 510 are generally known in the art and are not be discussed in detail herein. There are seven contacts 511 shown on the logic terminal 510 of FIG. 9; however, it should be appreciated that a different number of contacts 511 may be employed depending on the functions desired.

The power terminal 512 is embodied as a positive male terminal blade and adapted to engage with a contact tongue 212 (female terminal) in the battery terminal block 200. Power terminals 514 and 516 are negative male terminal blades and adapted to engage with contact tongues 214 and 216 (female blades), respectively, in the battery terminal block 200. The power terminal 514 is employed for a charging function and the power terminal 516 is employed for a discharging function. It should be appreciated that the charging/discharging functions may be reversed in these two terminals 514, 516.

Figure 10:
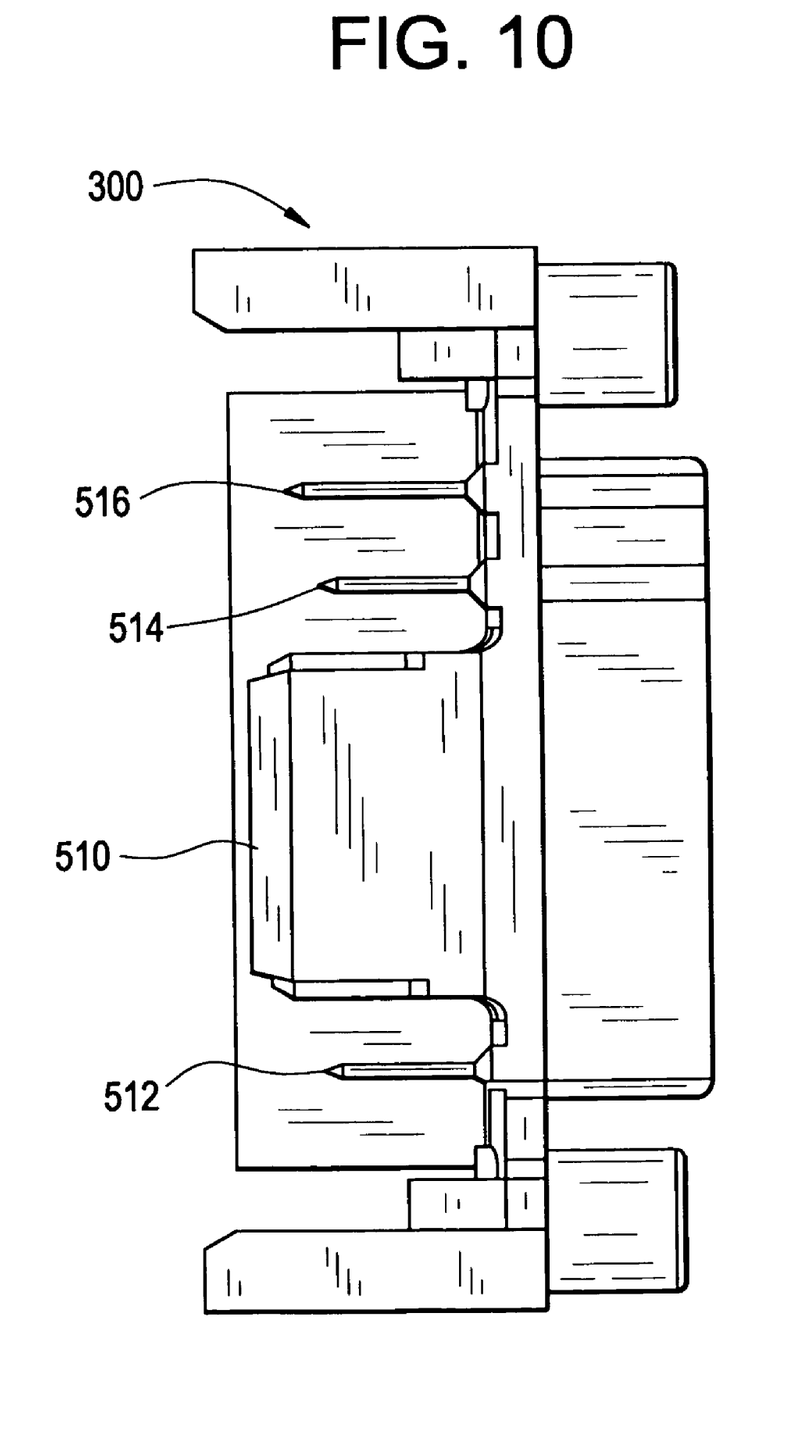
FIG. 10 is a top view of a terminal block in accordance with an exemplary embodiment of the present invention.

Referring to FIG. 10, the power terminal 516 is slightly offset (or longer) than the power terminal 514 or the power terminal 512 so that terminal 516 initially contacts i.e., (mates first with) tongue 216 on the battery pack 10. In other words, the charge negative (ground) power terminal 516 is offset or extended forward of the other power terminals 514, 516 so as to mate first and precede mating of the other power terminals 512, 514. The offset negative power terminal 516 establishes a ground contact to act as a safety mechanism for electric shock and/or avoid static shock in the cordless power tool 30 or charger 50 and/or battery pack 10. Moreover, providing a longer or offset negative power terminal 516 allows the use of the same geometry as the discharge negative and positive terminals, while enabling the negative terminal blade to mate first before the other terminals. This establishes a solid ground before the other circuits are connected.

Referring back to FIG. 9, terminal block 300 includes a logic terminal protector 520 below the logic terminal 510. The logic terminal protector 520 engages with the aperture 220 (as shown in FIG. 5) in the battery pack terminal block 200. The logic terminal protector 520 may be embodied as a longitudinally elongated platform below the logic terminal 510 to act as a guiding means for insertion to the battery pack terminal block 200. The logic terminal protector 520 has generally the same width as the logic terminal 510, and may shield the logic terminal 510 from debris and contamination. Further, during impact of the tool 30 (or charger 50), the logic terminal protector 520 may protect the logic terminal 510 from damage, and/or be used as a 'lock-out' scheme to prevent mating between other non-standard or improper battery packs.

The main body 501 includes a plurality of ribs 507 for strengthening the structure of the terminal block 300. The plurality of ribs 507 may also act as a "stop" element when interconnecting the terminal block 300 with the battery pack terminal block 200. The ribs 507 may be disposed on an underside of the top plate 505, formed on a surface of the logic terminal protector 520, or both, as shown in FIG. 9

The terminal block 300 includes a pair of laterally spaced grooves 530. The laterally spaced grooves 530 are assembled to retain the terminal block 300 within the cordless power tool 30 or charger 50. The terminal block 300 includes an extension 519 on the face of the terminal block. The extension 519 is a structural element which acts as a 'stop' member for the terminal block 300.

The terminal block 300 includes a pair of apertures 540. Each aperture holds a coil spring 545 therein. The springs 545 may engage with the surface of flange member rail 182 located on the battery pack 10 so as to absorb the impact when the cordless power tool 30 (or charger 50) engages the battery pack 10. In other words, the springs 545 may act as a shock absorber to reduce impact. The springs 245 may also provide a resistance when the tool and the battery are connected (e.g., the springs 245 affect not only a mechanical engagement/disengagement, but also causes the electrical connection between battery pack and the tool to be safely interrupted).

Moreover, the springs 245 may aid in battery pack ejection. When the user depresses the latch button, the springs 245 effectively push the battery pack clear of the terminals, and make it easier for the user to remove the battery pack from the tool.

Figure 11:
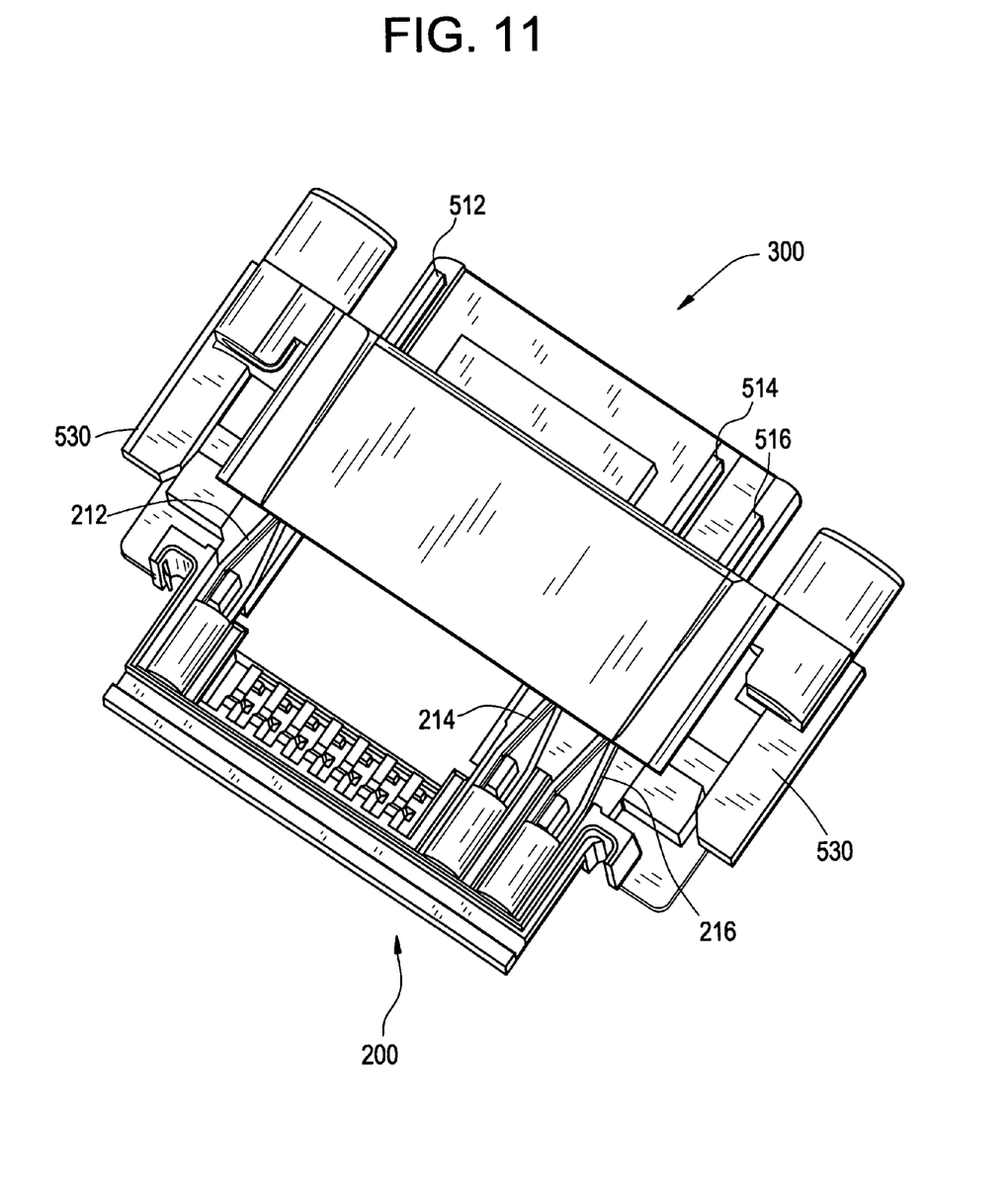
FIG. 11 is a schematic view of terminal blocks interconnected in accordance with an exemplary embodiment of the present invention.

FIG. 11 is a schematic view of the terminal blocks 200, 300 interconnected in accordance with an exemplary embodiment. Referring to FIG. 11, a battery terminal block 200 and a terminal block 300 are interconnected to illustrate the mechanical and electrical connections. Terminal block 300 can be part of the housing of power tool 30 or charger 50. Thus, this terminal block 300 in general forms part of an electrical device that is to be engaged to a battery pack such as pack 10.

The battery pack terminal block 200 includes a female positive terminal (tongue 212), a first female negative terminal (tongue 214) and a second female negative terminal (tongue 216). The female positive terminal 212 is adapted to engage male blade terminal 512 of the terminal block 300. The first female negative terminal 214 is adapted to engage with male blade terminal 514 of the terminal block 300, and the second female negative terminal 216 is adapted to engage with male blade terminal 516 of the tool/charger terminal block 300.

As the battery pack 10 is inserted into the cordless power tool 30 or charger 50, the alignment of battery pack terminals and tool/charger terminals occur in two stages. In the first stage, the guide rails 179 of the battery pack 10 are loosely or coarsely engaged in the mating guide rails 612, 614 of the tool housing 602. In order to facilitate the cooperative engagement of the rails, the leading edges of rails 179 are beveled or chamfered 183 (shown best in FIG. 2). Moreover, the leading edges of rails 612, 614 are also beveled or chamfered (shown at 617 in FIG. 8).

In the second stage, which occurs after the battery pack 10 has traveled a relative distance into the a housing of the electrical device (i.e., tool housing 602 or charger housing open cavity 425), the tool terminal block 300, which includes laterally spaced grooves 530 (shown in FIG. 9), engage guide rails 189 (FIG. 2) positioned on the top surface of the bottom portion 176 on the top housing 110 of battery pack 10. The rails 189 ensure proper alignment with the grooves 530 (see FIGS. 9 and 11) for centering the terminal block 300 with the battery pack terminal block 200, and providing the displaceable distance for the terminal block 300.

The exemplary embodiments being thus described, it will be obvious that the same may be varied in many ways. Such variations are not to be regarded as departure from the exemplary embodiments, and all such modifications as would be obvious to one skilled in the art are intended to be included within the scope of the following claims.

What is claimed:

1. A charger, comprising:
    a housing including a top housing portion and a bottom housing portion;
    an open deck cavity formed through the top and bottom housing portions for receiving a battery pack;
    a pair of vertically spaced rails disposed in sides of the open deck cavity for engaging grooves on the battery pack; and
    a terminal block disposed within the open deck cavity for providing electrical connections between the charger and the battery pack,
    wherein the terminal block is configured to float side-to-side to provide displaceable movement of the terminal block within the housing for aligning the battery pack within the charger.

2. The charger according to claim 1, wherein the displaceable movement of the terminal block is ±2 mm in either direction.

3. The charger according to claim 1, wherein the terminal block further comprises:
    a main body portion;
    a logic terminal portion for insertion into a terminal block of the battery pack; and
    a plurality of blades for providing power functions and adapted to engage contact tongues on the battery pack terminal block.

4. The charger according to claim 3, wherein a plurality of contacts are provided on a top surface of the logic terminal portion.

5. The charger according to claim 3, wherein a plurality of contacts are provided on a bottom surface of the logic terminal portion.

6. The charger according to claim 3, wherein one of the plurality of blades is offset forward of other blades so as to mate first with one of the contact tongues on the battery pack terminal block.

7. The charger according to claim 3, wherein the terminal block further comprises a logic terminal protector configured to engage an aperture in the battery pack terminal block.

8. The charger according to claim 7, wherein the logic terminal protector is below the logic terminal portion to act as a guide as the battery pack is inserted into the open deck cavity.

9. A cordless power tool, comprising:
    a tool housing including a first clam-shell half and a second clam-shell half joined together at a longitudinal centerline of the housing that bisects the two clam-shell halves;
    a pair of spaced guide rails disposed on the bottom of the tool housing along opposing side edges at the housing bottom for engaging grooves of a battery pack; and
    a terminal block disposed in the bottom of the housing for providing electrical communications between the cordless power tool and battery pack,
    wherein the terminal block is configured to float side-to-side to provide displaceable movement of the terminal block within the housing for aligning the battery pack with the power tool.

10. The cordless power tool according to claim 9, wherein the displaceable movement of the terminal block is ±2 mm in either direction.

11. The cordless power tool according to claim 9, wherein the terminal block further comprises:
    a main body portion;
    a logic terminal portion for insertion into a terminal block of the battery pack; and
    a plurality of blade terminals for providing power functions and adapted to engage contact tongues on the battery pack terminal block.

12. The cordless power tool according to claim 11, wherein a plurality of contacts are provided on a top surface of the logic terminal portion.

13. The cordless power tool according to claim 11, wherein the plurality of contacts are provided on a bottom surface of the logic terminal portion.

14. The cordless power tool according to claim 11, wherein one of the plurality of blade terminals is offset forward of other blades so as to mate first with one of the contact tongues.

15. The cordless power tool according to claim 9, wherein the terminal block further includes a logic terminal protector configured to engage an aperture in the battery pack terminal block.

16. The cordless power tool according to claim 15, wherein the logic terminal protector is below the logic terminal portion to act as a guide while inserting the battery pack into the power tool.

17. A system, comprising:
- a battery pack having a pack housing and a battery terminal block disposed therein, the battery terminal block including a battery logic area and a plurality of female power terminals, the pack housing having a pair of grooves, each groove formed along opposite sides of the pack housing; and
- a power tool including a tool housing having a pair of spaced guide rails disposed on side edges at a bottom of the tool housing and slidably receivable in the corresponding grooves of the pack housing, the tool housing including a tool terminal block for mating with the battery terminal block, the terminal block including a logic terminal configured to mate within the battery logic area and including a plurality of male blade terminals for engaging the female terminals in the battery terminal block,
- wherein the tool terminal block is displaceable within the tool housing so that it can move side-to-side to align the battery terminal block relative to the tool terminal block prior to connecting the corresponding terminal blades and logic terminals.

18. The system of claim 17, wherein the tool terminal block is displaceable ±2 mm in either direction, further comprising a tool having a tool housing, the tool housing includes a pair of vertical spaced guide rails disposed in lateral sides at a bottom of the housing for engaging with the pair of grooves on a battery pack.

19. The cordless power tools system according to claim 17, wherein the tool housing includes a tool terminal block disposed in the bottom of the housing for providing electrical communications between the cordless power tool and the battery pack.

20. The cordless power tools system according to claim 19, wherein the tool terminal block including a logic terminal portion configured to be inserted into the battery terminal block, and a plurality of male blade terminals for providing charging/discharging power functions and adapted to engage with the female terminals in the battery terminal block.

* * * * *

UNITED STATES PATENT AND TRADEMARK OFFICE
CERTIFICATE OF CORRECTION

| | | |
|---|---|---|
| PATENT NO. | : 7,944,174 B2 | Page 1 of 1 |
| APPLICATION NO. | : 12/588445 | |
| DATED | : May 17, 2011 | |
| INVENTOR(S) | : Adam M. Casalena et al. | |

It is certified that error appears in the above-identified patent and that said Letters Patent is hereby corrected as shown below:

<u>Column 14,</u>
Lines 10 and 15, delete "cordless power tools".

Signed and Sealed this
Fourth Day of October, 2011

David J. Kappos
*Director of the United States Patent and Trademark Office*